United States Patent
Philipp (10) Patent No.: US 9,489,072 B2
(45) Date of Patent: Nov. 8, 2016

(54) NOISE REDUCTION IN CAPACITIVE TOUCH SENSORS

(75) Inventor: Harald Philipp, Hamble (GB)

(73) Assignee: Atmel Corporation, San Jose, CA (US)

(*) Notice: Subject to any disclaimer, the term of this patent is extended or adjusted under 35 U.S.C. 154(b) by 779 days.

(21) Appl. No.: 12/761,238

(22) Filed: Apr. 15, 2010

(65) Prior Publication Data

US 2011/0254802 A1    Oct. 20, 2011

(51) Int. Cl.
  *G06F 3/045* (2006.01)
  *G06F 3/041* (2006.01)
  *G06F 3/044* (2006.01)

(52) U.S. Cl.
  CPC ............ *G06F 3/0412* (2013.01); *G06F 3/044* (2013.01); *G06F 3/0418* (2013.01)

(58) Field of Classification Search
  CPC ..... G06F 3/0412; G06F 3/0418; G06F 3/044
  USPC ........... 345/173–184, 156; 178/18.01–18.09; 315/149, 150
  See application file for complete search history.

(56) References Cited

U.S. PATENT DOCUMENTS

| | | | |
|---|---|---|---|
| 6,239,788 B1* | 5/2001 | Nohno et al. | 345/173 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2004/0100450 A1* | 5/2004 | Choi | 345/173 |
| 2005/0275508 A1* | 12/2005 | Orr et al. | 340/407.1 |
| 2006/0192766 A1* | 8/2006 | Nakamura et al. | 345/173 |
| 2008/0309635 A1 | 12/2008 | Matsuo | |
| 2009/0315854 A1 | 12/2009 | Matsuo | |
| 2009/0322701 A1* | 12/2009 | D'Souza et al. | 345/174 |
| 2010/0085322 A1* | 4/2010 | Mamba et al. | 345/173 |
| 2011/0157067 A1* | 6/2011 | Wagner et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Kumar Patel
*Assistant Examiner* — Insa Sadio
(74) *Attorney, Agent, or Firm* — Baker Botts L.L.P.

(57) ABSTRACT

In touch sensitive display devices, the display scanning circuitry responsible for driving images of the panel screen can cause noise on the electrodes of nearby touch sensors. The display controller circuit and/or the touch sensor controller circuit of the exemplary touchscreen display devices may be configured to reduce such noise during the touch sensor acquisition cycle by implementing one or more of several techniques in which a portion of each of the sensor acquisition cycles occurs within a period of reduced noise from a cycle of the scanning of the display.

37 Claims, 10 Drawing Sheets

(56) References Cited

U.S. PATENT DOCUMENTS

2012/0243719 A1 9/2012 Franklin
2013/0076612 A1 3/2013 Myers

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

NOISE REDUCTION IN CAPACITIVE TOUCH SENSORS

TECHNICAL FIELD

The present subject matter relates to techniques and devices to reduce noise during capacitive sensing.

BACKGROUND

Touch sensors, for example capacitive touch sensors, used in touch sensitive display systems are subject to noise from nearby display scanning circuitry. Noise makes touch detection less reliable. In some touchscreen designs, stack materials between the touch electrodes and the display driver circuitry offer a degree of noise screening. However, enhancing this by providing additional screening layers can be costly and it tends to contribute at least some additional thickness to the panel. Moreover, certain types of displays use driver circuitry that utilizes relatively high switching voltages. For example, electrophoretic panel screens tend to use high switching voltages (for example in the range of 50-100 volts) and these generate significant amounts of noise at the output of nearby touch electrodes. Known shielding approaches may not provide sufficient shielding capability with respect to noise caused by such high switching voltages.

In other types of touchscreens, for example designs using LCD displays in combination with a stack of touchscreen layers, high sheet resistance of stack materials like indium tin oxide results in noise coupling through to the receive electrode layer (so-called "punch through" effect). Techniques based on filtering can reduce noise but tend to slow down response times and lead to increased power consumption.

SUMMARY

The display controller circuit and/or the touch sensor controller circuit in a touch sensitive display device, may be configured such that a portion of each of the sensor acquisition cycles occurs within a period of reduced noise from a duty cycle of the scanning of the display. The examples described below and shown in the drawings may provide one or more advantageous forms of noise reduction for the touch sensor.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

Reference now is made in detail to the exemplary devices and methods illustrated in the accompanying drawings and discussed below. A touch sensing display device or touchscreen display includes a display and a capacitive touch sensor with sensing electrodes in proximity to the display. Display scanning circuitry includes a controller circuit that controls the duty cycle of the display scanning. A touch sensor controller circuit controls the sensor acquisition duty cycle. In the examples below, either one or both of these controller circuits may be configured in any of a number of exemplary ways to reduce noise in the capacitive touch sensor signal(s) due to the duty cycle of the display scanning.

Figure 1:
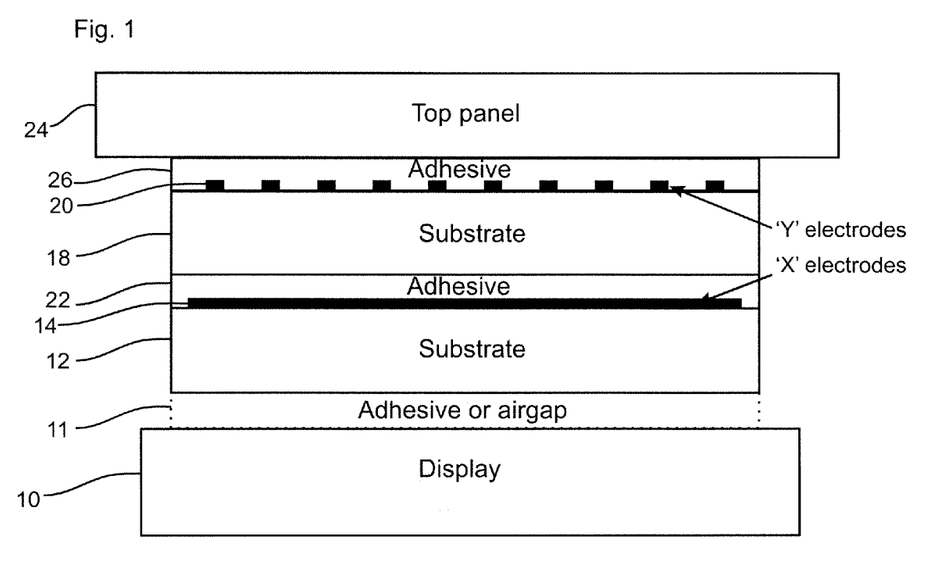
FIG. 1 is a schematic cross-sectional view through a layered stack of an exemplary touch sensitive display device.

FIG. 1 is a simplified cross-sectional illustration of a stack of materials of an exemplary touch sensitive display device. In such a touchscreen display, the stack includes a display 10 and a substrate 12 for the touch sensor elements, between which is an adhesive or air gap 11. The display 10 can be substantially any type of flat panel display, such as an electrophoretic display or a liquid crystal display (LCD). The touch sensor substrate 12 is formed of a suitable insulating material, such as a transparent plastic or glass material. A drive electrode layer 14 is provided on the substrate 12, which is bonded to a substrate layer 18 above via an adhesive layer 22. Exemplary electrode materials may include fine electrode structures made of metals such as copper and silver or clear conductors such as PEDOT and indium tin oxide (ITO). The receive electrode layer 20 sits on top of the further substrate layer 18. A top panel 24, for example a glass or plastic panel, is adhered to the further substrate layer 18 and the receiver electrodes 20 by means of an adhesive layer 26. Other layer stacks are possible.

Each crossover or adjacency of the overlaid drive and receive electrodes forms a capacitive sensor "channel" or "key" by mutual capacitance. A touch signal is acquired from each such channel. The disclosed example relates to a capacitive sensor based on mutual capacitance between the X and Y electrode structures, however, a skilled person will appreciate that the techniques disclosed herein apply equally to other sensor designs, such as capacitive sensor designs based on self capacitance.

Figure 2A:
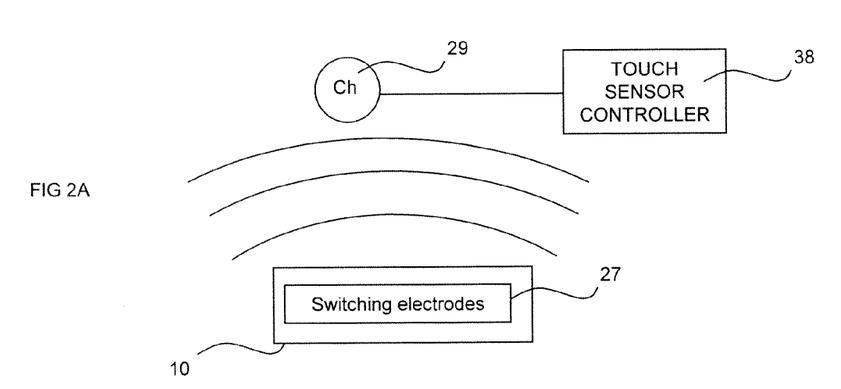
FIGS. 2A and 2B illustrate the effect of radiative noise on capacitive sensors.

FIG. 2A illustrates a source of radiative noise and a receive channel 29 connected to a touch sensor controller circuit 38. The switching electrodes 27 forming the driver circuitry of display 10 represent a source of radiative noise capable of coupling into the channel 29 or the wiring connecting to it. Such noise may be problematic if the scanning circuitry operates at frequencies that are close to the frequencies that may be used in a touch sensor acquisition process, which may be a few kilohertz to a few hundred kilohertz.

Figure 2B:
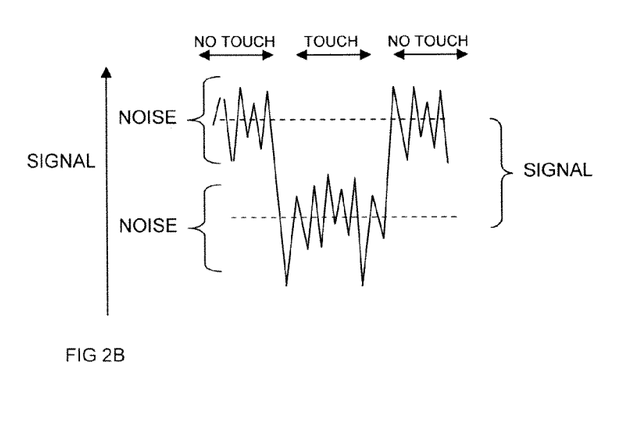

FIG. 2B shows how a touch signal in a mutual capacitor can be affected by noise. In the illustrated case, a finger (or, alternatively, a stylus) absorbs charge from the channel. The average signal level with a finger present ("touch") is below the average signal level in the absence of the finger ("no touch"). The radiated noise tends to appear at the sensor output whether or not there is a touch present and can couple into the measurement of the touch signal. Noise of this type can cause false touch detections, erroneous and noisy position coordinates, and generally unreliable behavior. In a worst case, such effects may not be easily filtered out by algorithms or circuit adjustments without materially degrading speed relative to power consumption.

Figure 3A:
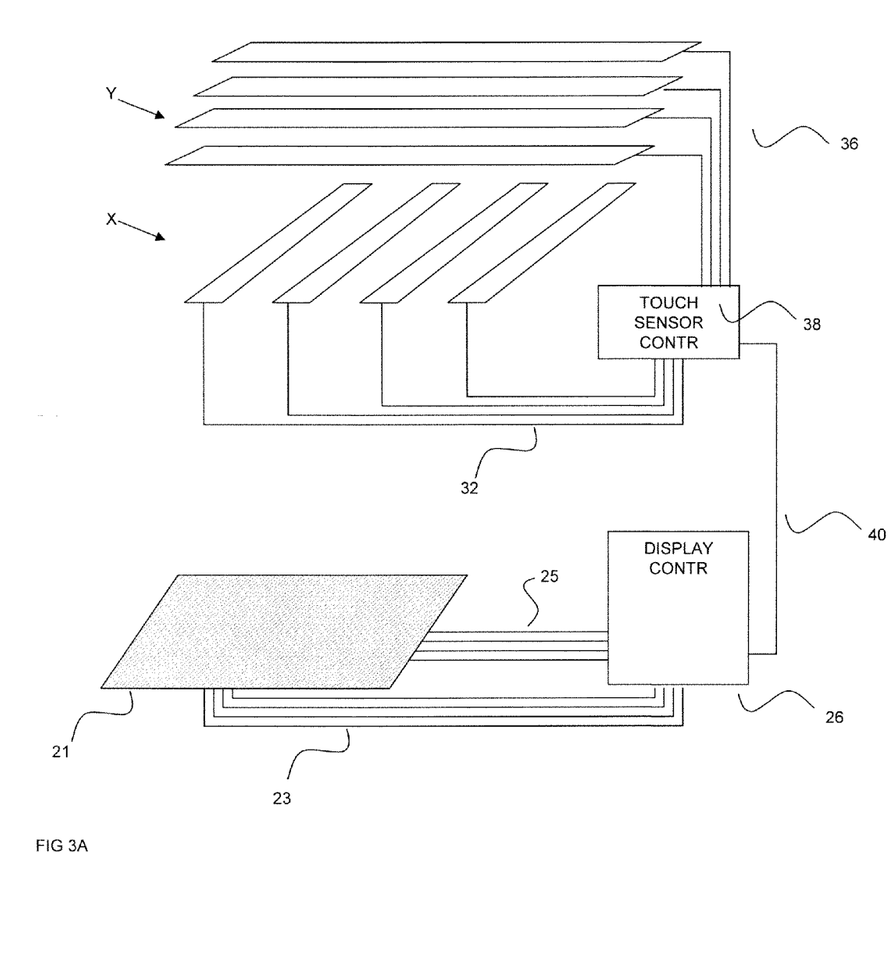
FIG. 3A is a schematic illustrating exemplary display driver and touch control circuitry.

FIG. 3A illustrates the display scanning circuitry of a panel display disposed in proximity to the touchscreen sensors. In this example, the display scanning circuitry includes a display controller circuit 26 provided with scanning circuitry arranged to drive the column drive lines 23 and the row drive lines 25 that are coupled, respectively, to a matrix 21 of switched image generation elements. The display controller circuit has a microcontroller, memory, serial interfaces and display drive circuitry configured to cause the matrix to be scanned in a manner well known in the art such that images are generated on the display.

Above the display scanning circuitry are shown the drive (X) and receive (Y) electrodes of a capacitive touch sensor circuit. The drive electrodes (X) are coupled to a touch sensor controller circuit 38 via drive lines 32, and the receive electrodes (Y) are coupled to the touch sensor controller circuit 38 by receive lines 36. The touch sensor controller circuit 38 includes circuitry for initiating and controlling touch channel acquisition processes, as well as for storing and processing the acquired data. The touch sensor controller circuitry permits respective touch channels to be sampled by combinations of drive bursts and receive line enablements creating a signal result for each channel to achieve sensor signal acquisitions for touch sensing. Such controller circuits are capable of driving and receiving multiple channels of a row in parallel. This may reduce the acquisition period substantially. Also, it may be possible, for example, to sense up to 224 mutual capacitance channels in under 1 ms (millisecond) and to track a touch location up to every 4 ms (milliseconds). A skilled person will appreciate that various implementations of suitable controller circuitry may be selected in other examples.

In the disclosed example, a control signal path 40 connects the touch sensor controller circuit 38 and the display controller circuit 26 and is capable of carrying messages and/or signaling between the controller circuits. Such a control signal path may, for example, be implemented as a serial interface, a bus or the like. For the purpose of this disclosure the terms "message" and "signal" are used interchangeably and a skilled person will appreciate that any suitable control signal path or messaging protocol can be used in accordance with the teachings herein. Although the example shows discrete display and touch sensor controller circuits, it is possible for the display controller circuit and the touch sensor controller circuit to be implemented as a single circuit/controller, or, alternatively, as distributed circuit components.

Figure 3B:
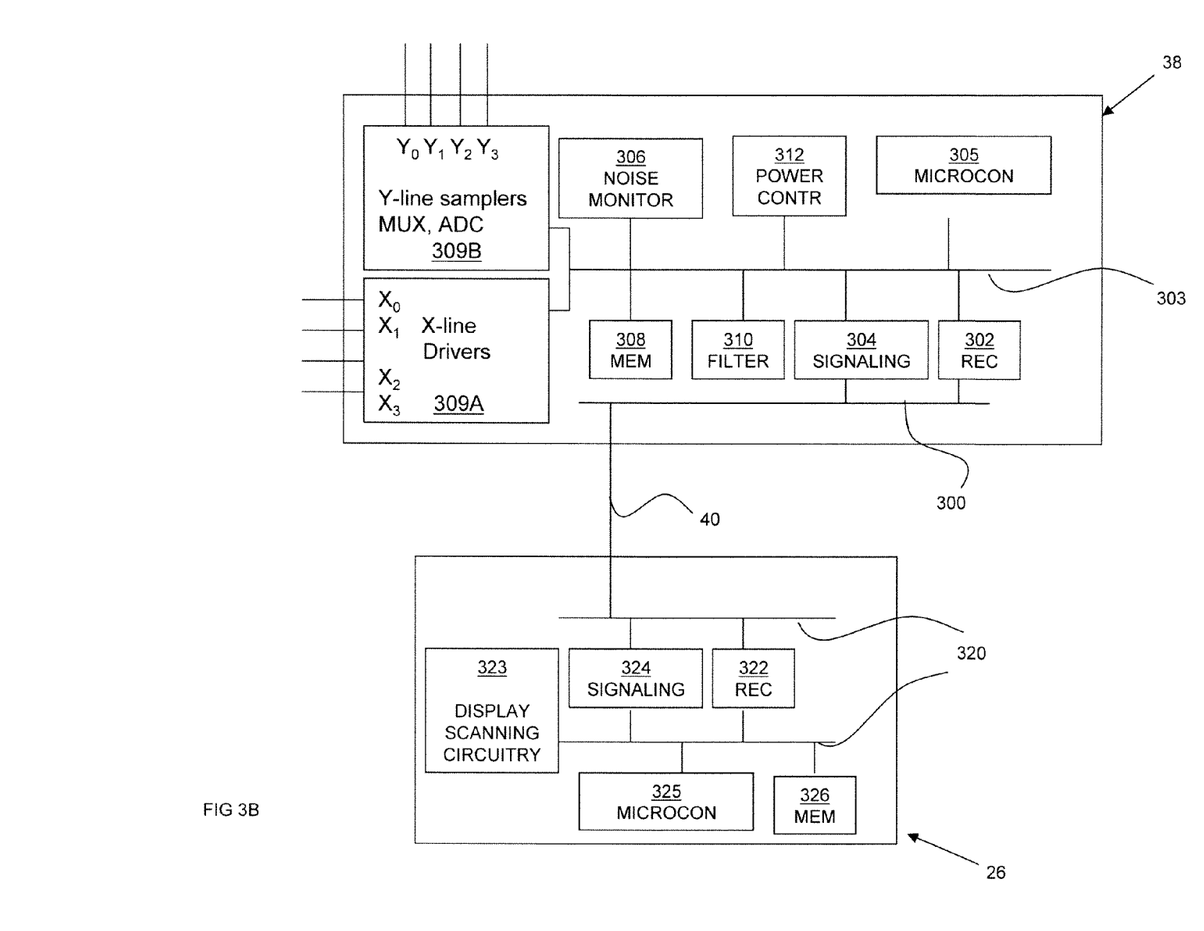
FIG. 3B is a block diagram illustrating a touch sensor controller circuit and a display controller circuit from FIG. 3A.

FIG. 3B shows more detail of the touch sensor controller circuit 38 and the display controller circuit 26, by way of example. The touch sensor controller circuit 38 has X-line drivers 309A and Y-line samplers 309B. The Y-line samplers 309B include charge integrators, such as capacitors, which both integrate the line charges and operate as sample and hold circuits. The Y-line samplers 309B are selectable by a multiplexer (MUX); and the integrated line charges are provided to an analog-to-digital converter (ADC), which converts the integrated line charges into digital values for processing. A bus 303 connects the various elements of the touch sensor controller circuit configured to perform sensor acquisition and data processing. The touch sensor controller circuit 38 has a microcontroller 305 as the circuit to control and coordinate operation of the touch sensor controller circuit 38, including the initiation and duration of X-line driving and Y-line sampling as well as the operations of a display controller interface 300, receive circuitry 302 for receiving control information from the display scanning circuitry, signaling circuitry 304 for generating control information to be provided to the display scanning circuitry, a noise monitoring unit 306, a memory 308, a filter unit 310, and a power control unit 312.

The display controller circuit 26 has display scanning circuitry 323, including a microcontroller 325 as the circuit to control display scanning, as well as a memory 326 and connecting bus 327. In this case, the circuit 26 also has a touch sensor controller interface 320, receive circuitry 322, and signaling circuitry 324. The receive circuitry 322 receives control information from the touch sensor controller circuitry, and the signaling circuitry generates control information for the touch sensor controller circuitry. The microcontroller 325 controls the initiation of the display scanning process and coordinates these processes according to a predetermined scanning regime.

Although not shown, both the display controller circuit and the touch sensor controller circuit are also provided with a host interface enabling a host to configure master control logic, update firmware or control code, and the like.

In accordance with the present teachings, touch sensor controller circuits and display controller circuits, including those shown by way of examples in FIG. 3B, may be configured such that the sensor controller circuit performs touch acquisition cycles when the display controller circuit is in a mode of operation during which noise is reduced or limited. For example, each of the sensor acquisition cycles may occur within a period of reduced noise from a duty cycle of the scanning of the display. This noise reduction or limitation may be accomplished in a variety of ways, for example: (i) the display scanning circuitry may be operated at reduced switching voltages during touch acquisition cycles; (ii) the display scanning circuitry is not operated during touch acquisition cycles; (iii) the display scanning circuitry is operated at a frequency that reduces or limits noise during touch acquisition cycles; (iv) the display scanning circuitry is operated with a phase relative to phase of the touch acquisition cycles that reduces or limits noise during touch cycles; or (v) a combination of two or more of these ways. Accordingly, display scanning noise detectable by the touch sensor controller circuit may be substantially reduced by configuring duty cycle mismatches in respect of any one (or a combination of) timing, frequency, or phase. It is also possible to reduce the amplitude of the switching voltages employed in display scanning processes to reduce the noise in touch sensor acquisition cycles.

Figure 4:
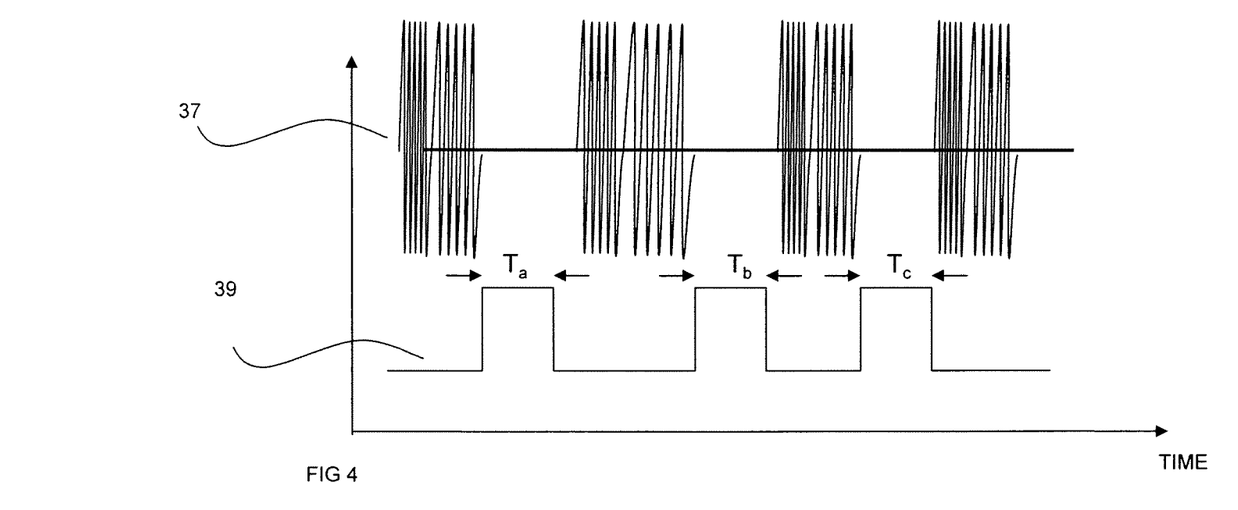
FIG. 4 shows graphs of display scanning noise at the touch electrode output and touch acquisition activity over time.

With reference to the example of FIG. 4, there, the touch sensor controller circuit operates during non-scanning periods when the display controller circuit is not driving scanning signals to the display matrix. In another example, the touch sensor controller circuit is configured to minimize the instances in which both display scanning and touch sensor acquisition occur contemporaneously. The first timing diagram 37 plots radiated noise at the touch sensor output arising from display scanning activities as a function of time. The second timing diagram 39 plots touch acquisition activity as a function of time. It will be apparent that the touch sensor controller circuit is configured such that touch sensing signal acquisitions occur in periods when the display controller circuit is not scanning the lines of the matrix, so as to substantially attenuate the effect of noise arising from the display scanning circuitry on the touch sensor acquisition process.

Various different display scanning duty cycles exist and some provide quiescent or noise reduced periods of suitable duration and frequency for touch sensor acquisition cycles to be interleaved. Other scanning duty cycles can be adjusted to provide quiescent periods of suitable duration and frequency to permit touch acquisition cycles to be interleaved without noticeable degradation in display performance. The time periods of sensor acquisition activity could be anything from several milliseconds, down to a microsecond or even a fraction of a microsecond. Sensor acquisition activity can thus be interleaved with noisy display scanning activity, such that in some embodiments, both activities seldom if ever occur at the same time, while in other embodiments, the extent to which both activities occur at the same time may be minimized in a manner that trades off screen performance and touch detection reliability. For example less than 50% of the display scanning duty cycle may be interrupted with sensor burst cycles. As an alternative example, less than 25%, and preferably no more than 2 to 20% of the display scanning duty cycle may be interrupted with sensor burst cycles.

In view of the explanations provided herein, a skilled person will appreciate that periods of quiescence and touch sensor acquisition required to establish the desired duty cycle interleaving are configurable aspects of the device controllers. Accordingly, they are dependent upon the nature of the display and touch sensor implementation. However, it is possible to select interleaved duty cycles to provide reasonable response times with flicker-free function and yet allow sufficient time on average to perform reliable touch detection. This is particularly so in the case of electrophoretic displays in which adjustments to the usual scanning duty cycle are less discernible.

Figure 5A:
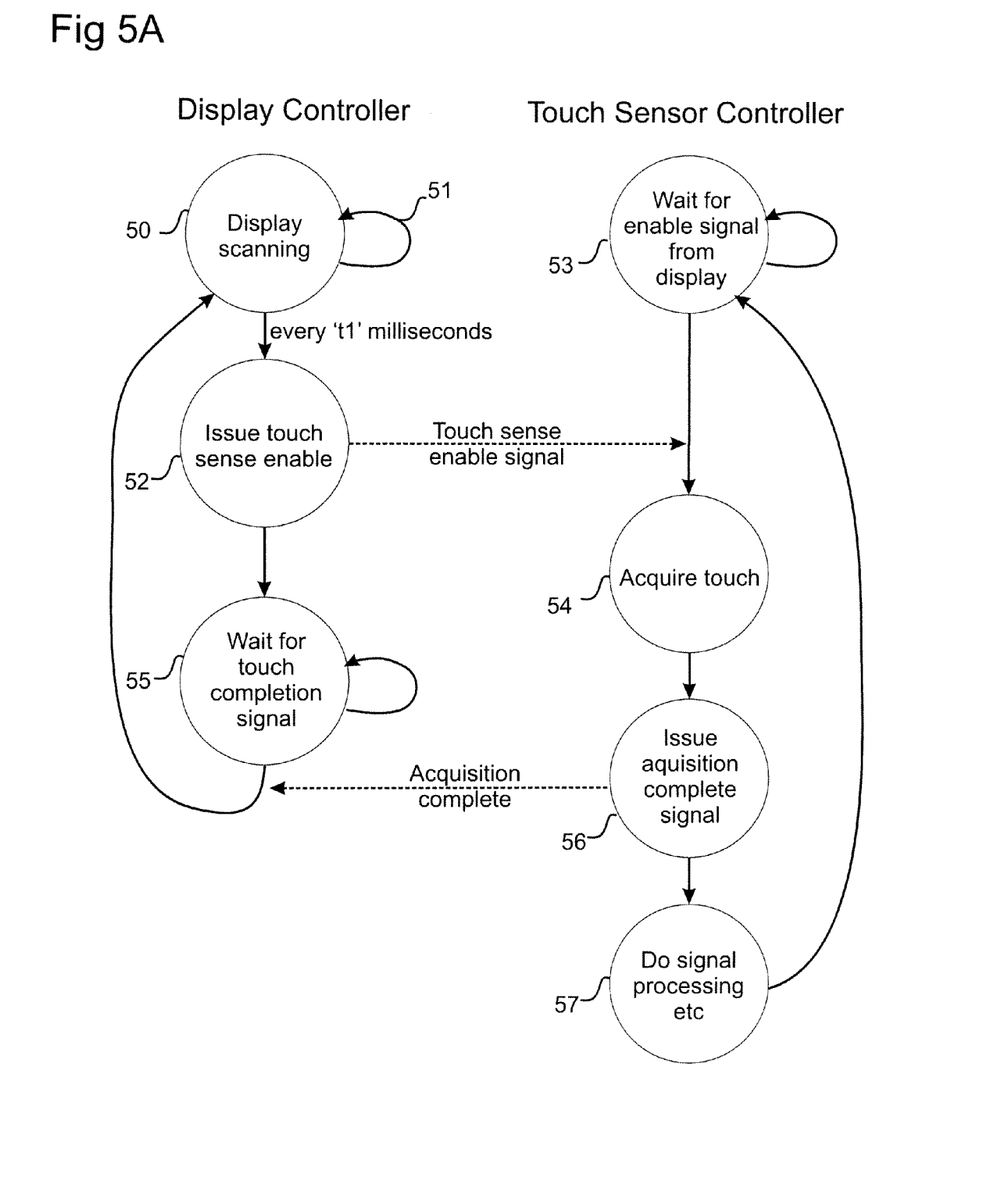
FIGS. 5A and 5B are state diagrams illustrating exemplary touch acquisition and scanning processes implemented using signaling between a display controller circuit and a touch sensor controller circuit.
Figure 5B:
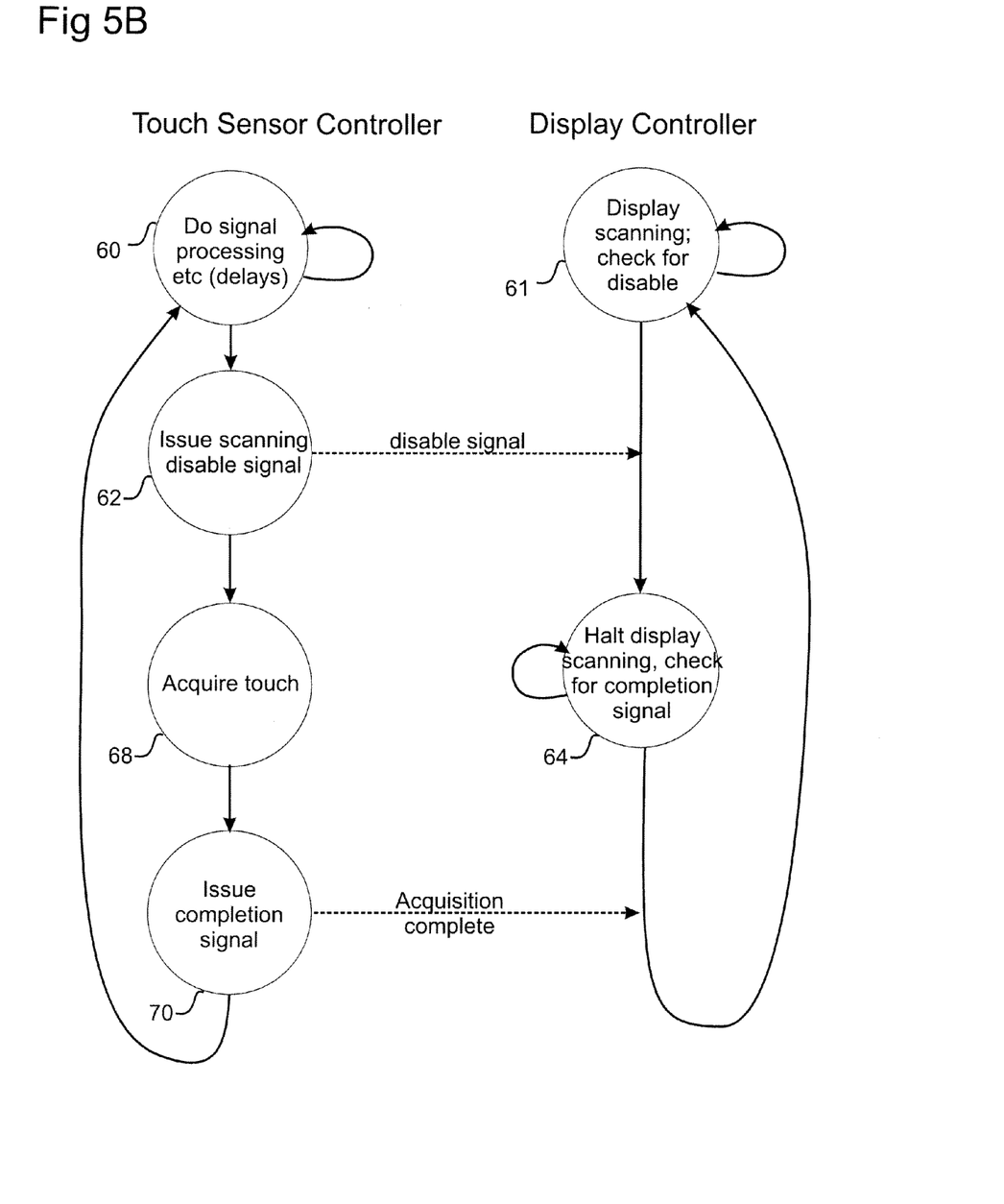

FIGS. 5A and 5B are state diagrams illustrating modes of operation of exemplary display controller circuit 26 and a touch sensor controller circuit 38 capable of bidirectional signaling or message exchange between them. In one example, the display controller circuit issues a sense enable signal in order to let the touch sensor controller circuit know it can begin a sensor acquisition cycle. With reference to FIG. 5A, the display controller circuit is in a scanning state 50 according to which it loops between scanning cycles as represented by the loop transition 51. Every t1 milliseconds the display controller circuit comes to a temporary halt in the scanning duty cycle, issues a sense enable signal 52 to the touch sensor controller circuit and transitions to a state in which it awaits a further control signal. Before receipt of the sense enable signal, the touch sensor controller circuit is in a looping wait state 53. The touch sensor controller circuit starts a sensor acquisition cycle 54 in response to receipt of the enable signal. Once the sensor acquisition cycle is complete, the touch sensor controller circuit issues an acquisition complete signal 56 to the display controller circuit. Then, the display controller circuit can resume display scanning 50 responsive to receipt of the acquisition complete signal and helps mitigate visual effects of any adjustment to the screen scanning duty cycle to permit the sensor acquisition cycles. After issuing the acquisition complete signal, the touch sensor controller can perform signal processing on the acquired data 57 and then transition back to the wait enable state 53.

In the case of FIG. 5A, the display controller circuit controls the issuance of sense enable signals pursuant to a set of rules configured to allow an overall sensor acquisition duty cycle that achieves reliable touch detection in the application in question. These rules may be stored as control code in a memory of the display controller circuit. Alternatively, the rules may be implemented in hardware or firmware. The period t1 is a configurable aspect of the system and is at least partially dependent on the application.

FIG. 5B is an example in which the touch sensor controller circuit issues a scanning disable signal when it intends to start an acquisition cycle. The touch sensor controller circuit is in a general signal processing state 60 while the display controller circuit is operating according to a predetermined display scanning duty cycle 61. Every t1 milliseconds, the touch sensor controller circuit issues a scanning disable signal 62 to the display controller circuit. The display controller circuit temporarily halts scanning 64 when it receives the disable signal, and the touch sensor controller circuit commences a sensor acquisition cycle 68. Thereafter, the touch sensor controller circuit issues an acquisition complete signal 70 to the display controller circuit, so that the display controller circuit can resume the display scanning state 61.

In the case of FIG. 5B, the touch sensor controller circuit controls issuance of scanning disable signals pursuant to a set of rules configured to ensure an overall sensor acquisition duty cycle achieving reliable touch detection in the application in question. These rules may be stored as control code in a memory of the display controller circuit. Alternatively, the rules may be implemented in hardware or firmware. Again, the period t1 is a configurable aspect of the system and is at least partially dependent on the application.

Figure 6:
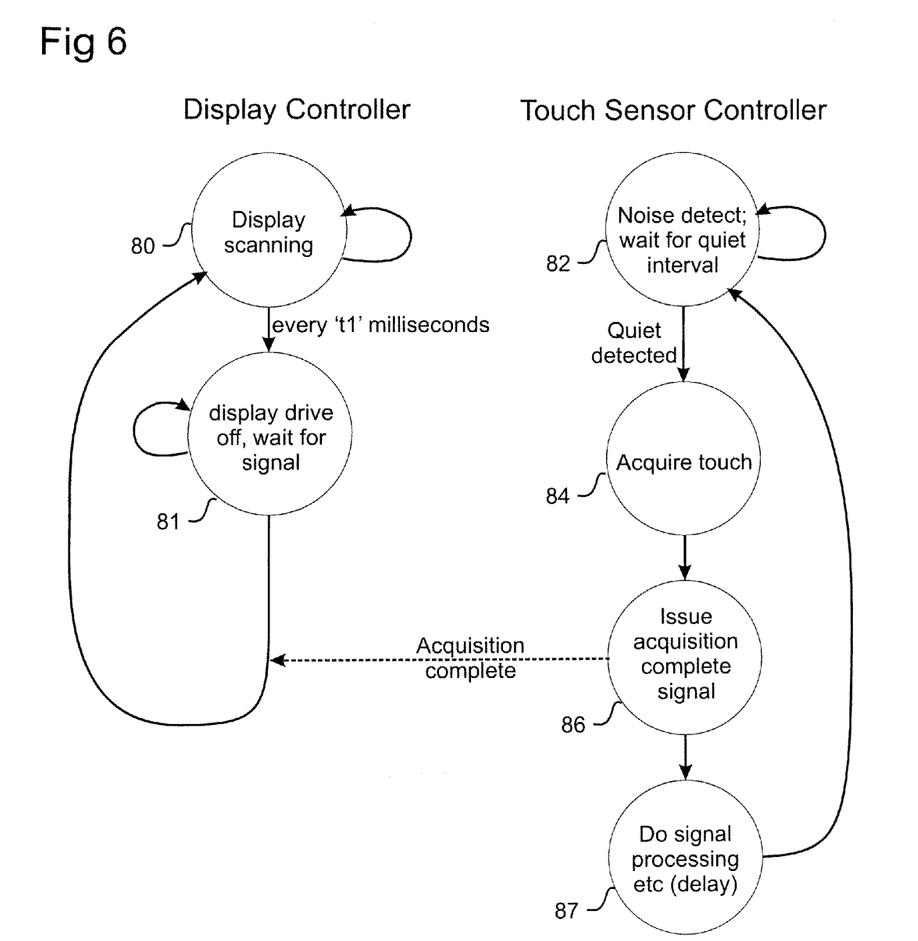
FIG. 6 is a state diagram illustrating exemplary touch acquisition and scanning processes implemented without using signaling between a display controller circuit and a touch sensor controller circuit.

In another example, the touch sensor controller circuit incorporates a noise detection algorithm capable of monitoring noise on the sensor output. FIG. 6 illustrates a process according to which non-scanning periods suitable for sensor acquisition are identified by the touch sensor controller circuit using a noise detection algorithm. While the display controller circuit is performing the display scanning duty cycle 80, the touch sensor controller circuit is in a noise monitoring state 82 and monitors the sensor output using a noise detection algorithm. Every t1 milliseconds, the display controller circuit transitions to a display scanning off state 81 and awaits an acquisition complete signal. The touch sensor controller circuit detects the absence of noise from the display and starts sensor acquisition 84 in response to the detection of the non-scanning period. When the touch acquisition cycle is complete, the touch sensor controller circuit issues an acquisition complete signal 86 to the display controller circuit, and the display controller circuit resumes display scanning 80. The touch sensor controller circuit transitions to a signal processing state 87 until it resumes noise monitoring 82.

Any suitable noise detection algorithm can be used and a skilled person will appreciate that selection may be application dependent. Noise radiated from the display drivers of electrophoretic or LCD displays may be detectable using a stochastic measurement process. For example, the touch sensor controller circuit can monitor noise levels on any capacitive receive lines using signal deviation as a metric for identifying the onset of non-scanning periods. Such algorithms and related rules can be stored as control code in a memory of the touch sensor controller circuit. Alternatively, the rules may be implemented in hardware or firmware. Again, t1 may be a configurable system parameter.

In another implementation that does not require signaling between the display and touch sensor controller circuit, the display scanning and sensor acquisition duty cycles may be interleaved based on predetermined timing regimes defining the duty cycle patterns such that sensor acquisition occurs during periods of non-scanning activity. Such timing regimes can be stored as control code in the memories of the display and touch sensor controller circuits. Alternatively, the rules may be implemented in hardware or firmware. In such cases, it is preferred to implement a suitable type of timing synchronization between the clocks driving the display and touch sensor controller circuits.

Figure 7:
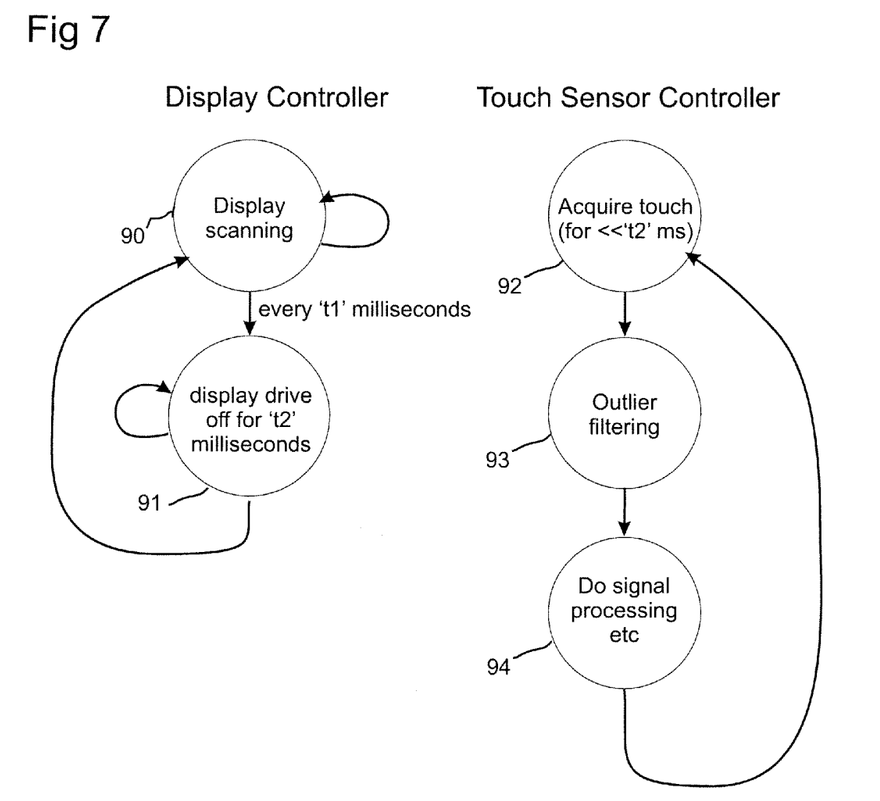
FIG. 7 is a state diagram illustrating a further exemplary touch acquisition and scanning process implemented using substantially continuous non-linear filtering.

FIG. 7 illustrates a further process in which control of each of the display scanning duty cycle and the sensor acquisition cycle may occur without relying on signaling between the display controller circuit and touch sensor controller circuit. Initially the display controller operates in a display scanning state 90. Every t1 milliseconds, the display controller circuit halts display scanning 91 for a period of t2 milliseconds. The touch sensor controller circuit is configured to perform sensor acquisition cycles 92 of a duration much less than t2 so that a statistically high proportion of the touch acquisition cycles are unaffected by display scanning noise, and such that reliable touch detection is achievable in the application concerned. In such cases, non-linear filtering (for example outlier filtering 93) by the touch sensor controller circuit is included as well as signal processing 94 to determine the coordinate location of the touch. For example, a skilled person would appreciate that centroid detection, weighted average or other process would be suitable for implementing the signal processing 94 to determine the coordinate location of the touch. This way, improved results can be achieved at the cost of increased power consumption, provided that the display duty cycle includes non-scanning periods occurring with sufficient duration and frequency to permit sensor acquisition to be performed reliably in between. The periods t1 and t2 are configurable aspects of the system and are at least partially dependent on the application.

Figure 8:
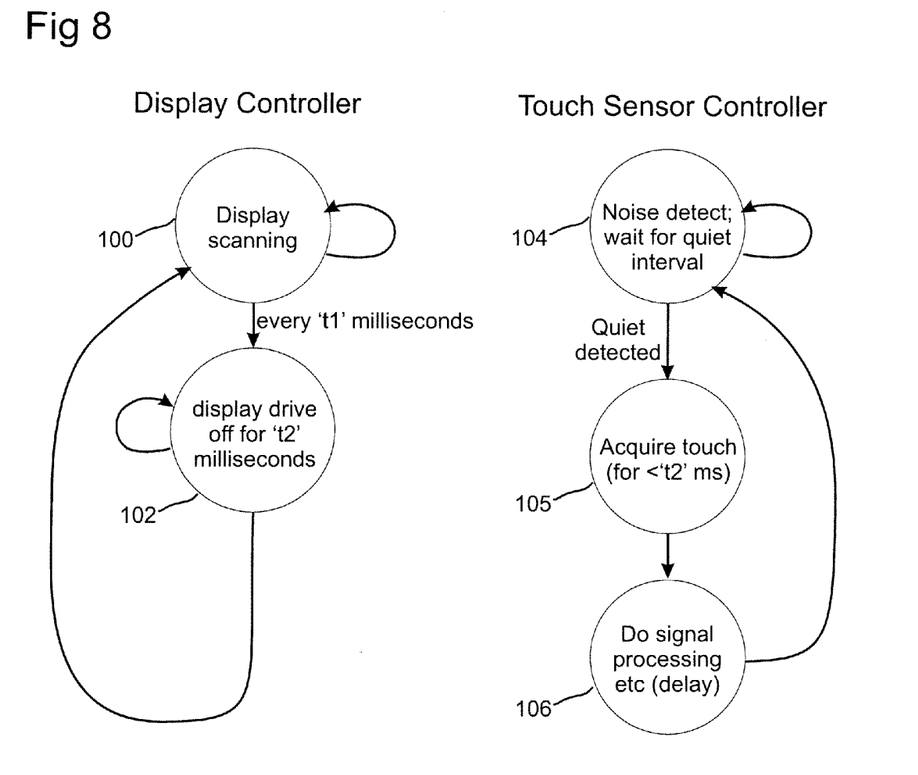
FIG. 8 is a state diagram illustrating a further exemplary touch acquisition and scanning process configured to reduce power of the touch sensor controller circuit.

FIG. 8 illustrates a process according to which the touch sensor controller circuit operates in a "low-power" mode, for example during noise monitoring of display scanning activity. Initially, the display controller circuit loops through display scanning processes 100. Every t1 milliseconds, it halts display scanning 102 for a period of t2 milliseconds, before resuming the display scanning state 100. The touch sensor controller circuit is initially in a noise monitoring mode 104 and transitions to a "powered up" mode for acquisition 105 when it detects the quiet associated with a non-scanning period. After the acquisition period 105, the touch sensor controller circuit performs signal processing on the acquired data 106, before resuming the noise monitoring state 104. As will be appreciated in view of the foregoing explanations, toggling between a low power mode and a sensor acquisition mode can be triggered by any suitable mechanism, including timing, signaling, event detection or the like. As in the previous example of FIG. 7, the periods t1 and t2 are configurable aspects of the system and are at least partially dependent on the application.

A skilled person reading this explanation will appreciate that the various functions of the control circuits relating to display scanning and touch sensor acquisition may be implemented as hardware or firmware or as computer readable code, or combinations thereof. Hence there are many ways to implement the exemplary noise reduction techniques in addition to those disclosed in the drawings.

The reduction of noise at touch sensor electrodes by timing the touch sensor acquisition to occur during noise reduced periods (e.g. non-scanning periods) of the display scanning duty cycle is a technique that may be suitable for implementation in various touchscreen applications, including LCD and other matrix driven panel technologies. This technique may be particularly effective in electrophoretic displays since the response times of such displays are naturally slow, with the result that the periods of noise reduced display scanning activity, into which the touch acquisition cycles are interleaved, are not easily discernable by the user of the display. Furthermore, this technique may allow new touch functions to be implemented in certain types of displays; for example it may allow "touch and drag" to be supported on electrophoretic displays. Additionally, this technique may reduce processing overhead because less filtering may be required, and, in certain designs, it may facilitate a reduction in stack layers that might otherwise be required for screening.

The discussion above addresses noise caused on the sensor channels by a local noise source having structured periodic noise inducing activities, such as the scanning in electroluminescent displays. The noise reduction techniques may be applicable to touch sensing systems that are subject to other types of structured periodic noise.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

What is claimed is:

1. A touch sensing display device, comprising:
   a display;
   a display controller circuit including display scanning circuitry and a controller arranged to control a duty cycle of scanning of the display;
   a capacitive touch sensor comprising at least one electrode in proximity to the display; and
   a touch sensor controller circuit arranged to control a sensor acquisition duty cycle with respect to a signal from the capacitive touch sensor,
   wherein at least one of the controller circuits is configured such that a portion of the sensor acquisition duty cycle occurs within a period of reduced noise from the duty cycle of the scanning of the display;
   wherein the touch sensor controller circuit is configured to:
   monitor, during the duty cycle of scanning of the display, noise on the capacitive touch sensor;
   initiate, in response to detecting an absence of noise from the display, the sensor acquisition duty cycle; and
   communicate, in response to completion of the sensor acquisition duty cycle, an acquisition complete signal to the display controller circuit to cause the display controller circuit to initiate another duty cycle of the scanning of the display.

2. The touch sensing display device of claim 1, wherein the at least one of the controller circuits is configured to create a mismatch with respect to timing, between the duty cycle of scanning of the display and the sensor acquisition duty cycle.

3. The touch sensing display device of claim 1, wherein the at least one of the controller circuits is configured to create a mismatch with respect to phase, between the duty cycle of scanning of the display and the sensor acquisition duty cycle.

4. The touch sensing display device of claim 1, wherein the at least one of the controller circuits is configured to create a mismatch with respect to frequency, between the duty cycle of scanning of the display and the sensor acquisition duty cycle.

5. The touch sensing display device of claim 1, wherein the at least one of the controller circuits is configured to create a mismatch with respect to a combination of at least two of timing, phase and frequency, between the duty cycle of scanning of the display and the sensor acquisition duty cycle.

6. The touch sensing display device of claim 1, wherein:
at least a portion of the duty cycle of scanning of the display overlaps at least a portion of the sensor acquisition duty cycle; and
the display controller circuit is configured to limit, during the portion of the duty cycle of scanning of the display that overlaps the portion of the sensor acquisition duty cycle, amplitude of switching voltages used during display scanning to reduce noise during the sensor acquisition duty cycle.

7. The touch sensing display device of claim 1, further comprising a control signal path between the display controller circuit and the touch sensor controller circuit.

8. The touch sensing display device of claim 7, wherein the display controller circuit comprises signaling circuitry configured to issue a sense enable indication to the touch sensor controller circuit over the control signal path.

9. The touch sensing display device of claim 7, wherein the touch sensor controller circuit comprises signaling circuitry configured to issue to the display scanning controller over the control signal path at least one of: (i) a disable scanning to the display scanning controller over the control signal path, and (ii) the sense acquisition complete signal.

10. The touch sensing display device of claim 1, wherein the touch sensor controller circuit comprises a noise monitoring unit configured to monitor, during the duty cycle of scanning of the display, the noise on the capacitive touch sensor.

11. The touch sensing display device of claim 10, wherein the touch sensor controller circuit is configured to determine periods of non-scanning activity based on data from the noise monitoring unit.

12. The touch sensing display device of claim 1, wherein the touch sensor controller circuit comprises a filtering unit configured to perform substantially continuous non-linear filtering.

13. The touch sensing display device of claim 1, wherein the touch sensor controller circuit comprises a power control unit configured to cause the touch sensor controller to switch to a power saving mode between periods of sensor acquisition activity.

14. The touch sensing display device of claim 1, wherein the at least one of the controller circuits is configured to reduce the extent to which the duty cycle of scanning of the display and the sensor acquisition duty cycle occur contemporaneously.

15. A circuit comprising:
display scanning circuitry for connecting to display lines coupled to drive picture elements of a display of a device, the device having a capacitive touch sensor and a touch sensor controller circuit configured to control a touch sensor acquisition duty cycle;
scanning select circuitry arranged to select the display lines and hence the picture elements to be driven; and
a display controller circuit for initiating and coordinating the driving of display lines, the display controller circuit configured to control a display scanning duty cycle to cause periods of reduced display scanning noise, the periods of reduced noise exceeding duration of the touch sensor acquisition duty cycle; and
wherein the touch sensor controller is further configured to:
initiate, in response to detecting an absence of noise from the display, the touch sensor acquisition duty cycle; and
communicate, in response to completion of the touch sensor acquisition duty cycle, an acquisition complete signal to the display controller circuit to cause the display controller circuit to initiate another display scanning duty cycle.

16. The circuit of claim 15, configured to create a mismatch with respect to timing, between the display scanning duty cycle and the touch sensor acquisition duty cycle.

17. The circuit of claim 15, configured to create a mismatch with respect to phase, between the display scanning duty cycle and the touch sensor acquisition duty cycle.

18. The circuit of claim 15, configured to create a mismatch with respect to frequency, between the display scanning duty cycle and the touch sensor acquisition duty cycle.

19. The circuit of claim 15, configured to create a mismatch with respect to a combination of at least two of timing, phase and frequency, between the display scanning duty cycle and the touch sensor acquisition duty cycle.

20. The circuit of claim 15, configured to limit amplitude of switching voltages used during display scanning to reduce noise during the touch sensor acquisition duty cycle.

21. The circuit of claim 15, configured to reduce the extent to which the display scanning duty cycle and the touch sensor acquisition duty cycle occur contemporaneously.

22. A circuit comprising:
a plurality of pins for connecting to capacitive touch sensor electrodes of a device having a display driven by display scanning circuitry according to a display scanning duty cycle;
sensor drive and sample circuitry connected to the pins and arranged to measure signals at touch channels and to determine which signals are indicative of a touch event at a channel; and
a controller circuit configured to control touch sensor acquisition duty cycles in which the sensor drive and sample circuitry measure signals at touch channels to occur at least substantially within periods subject to reduced noise from display scanning duty cycles; and
wherein the controller circuit is further configured to:
initiate in response to detecting an absence of noise from the display, a touch sensor acquisition duty cycle; and
communicate, in response to completion of the touch sensor acquisition duty cycle, an acquisition complete signal to a display controller circuit to cause the display controller circuit to initiate a display scanning duty cycle.

23. The circuit of claim 22, configured to create a mismatch with respect to at least one of timing, between the display scanning duty cycles and the touch sensor acquisition duty cycles.

24. The circuit of claim 22, configured to create a mismatch with respect to phase, between the display scanning duty cycles and the touch sensor acquisition duty cycles.

25. The circuit of claim 22, configured to create a mismatch with respect to frequency, between the display scanning duty cycles and the touch sensor acquisition duty cycles.

26. The circuit of claim 22, configured to create a mismatch with respect to a combination of at least two of timing, phase and frequency, between the display scanning duty cycles and the touch sensor acquisition duty cycles.

27. The circuit of claim 22, configured to limit amplitude of switching voltages used during display scanning to reduce noise during the touch sensor acquisition duty cycles.

28. The circuit of claim 22, configured to reduce the extent to which display scanning duty cycles and touch sensor acquisition duty cycles occur contemporaneously.

29. The circuit of claim 22, further comprising a display controller interface and receiver circuitry configured to receive and recognize a sense enable indication from the display controller circuit.

30. The circuit of claim 22, further comprising a display controller interface and signaling circuitry configured to issue a disable scanning indication to the display controller circuit.

31. The circuit of claim 22, further comprising a noise monitoring unit arranged to monitor an output of a touch sensor electrode to detect periods of reduced noise activity.

32. The circuit of claim 31, configured to control length of a touch sensor acquisition duty cycle to be less than the period of reduced noise activity.

33. The circuit of claim 22, further comprising a filtering unit configured to perform substantially continuous non-linear filtering.

34. The circuit of claim 22, further comprising a power control unit configured to switch to a first power mode during display scanning periods and operable to switch to a second power mode during touch sensor acquisition periods, wherein the circuit consumes less power in the first power mode than in the second power mode.

35. A method of operating a touch sensing display device comprising:
    operating a display controller circuit of a display of a touch sensing display device to control display scanning activities, the display having display scanning circuitry for generating visual images on the display;
    operating a touch sensor controller circuit of capacitive touch sensor circuitry of the touch sensing display device to control driving and sampling from at least one touch sensor electrode to detect touch events relating to the display;
    wherein the display controller circuit and the touch sensor controller circuit control display scanning and touch sensor acquisition according to regimes to reduce display scanning noise detectable by the touch sensor controller circuit during a sensor acquisition cycle in which the touch sensor controller drives and samples from at least one touch sensor electrode, the method further comprising:
        initiating, by the touch sensor controller circuit in response to detecting an absence of noise from the display, a sensor acquisition cycle; and
        communicating, by the touch sensor controller circuit in response to completion of the sensor acquisition cycle, an acquisition complete signal to the display controller circuit to cause the display controller circuit to initiate a display scanning duty cycle.

36. A device, comprising:
an intermittent noise source, the intermittent noise source associated with control circuitry;
a capacitive touch sensor comprising at least one electrode in proximity to the intermittent noise source;
a touch sensor controller circuit arranged to control a sensor acquisition duty cycle with respect to a signal from the capacitive touch sensor, wherein at least one of the noise source or the touch sense controller circuit is configured such that a portion of each of the sensor acquisition duty cycles occurs within a period of reduced noise of the intermittent noise source;
wherein the touch sensor controller circuit comprises a power control unit configured to cause the touch sensor controller to switch to a power saving mode between periods of sensor acquisition activity; and
wherein the touch sensor controller circuit is configured to:
    initiate, in response to detecting an absence of noise from the intermittent noise source, the sensor acquisition duty cycle; and
    communicate, in response to completion of the sensor acquisition duty cycle, an acquisition complete signal to the control circuitry associated with the intermittent noise source to cause the control circuitry to initiate an activity controlled by the control circuitry.

37. A method of operating device comprising:
operating an intermittent noise source of a device for a first purpose within the device, the intermittent noise source associated with control circuitry; and
operating a touch sensor controller circuit of capacitive touch sensor circuitry of the device to control driving and sampling from at least one touch sensor electrode to detect touch events relating to the device;
wherein the device controls noise generation and touch sensor acquisition according to regimes to reduce noise from the source detectable by the touch sensor controller circuit during a sensor acquisition cycle in which the touch sensor controller drives and samples to detect touch events relating to the device;
wherein the method further comprises causing the touch sensor controller to switch to a power saving mode between periods of sensor acquisition activity; and
wherein the touch sensor controller circuit is configured to:
    initiate, in response to detecting an absence of noise from the intermittent noise source, the sensor acquisition duty cycle; and
    communicate, in response to completion of the sensor acquisition duty cycle, an acquisition complete signal to the control circuitry associated with the intermittent noise source to cause the control circuitry to initiate an activity associated with the first purpose and controlled by the control circuitry.

* * * * *